United States Patent
Christie et al.

(10) Patent No.: US 6,785,790 B1
(45) Date of Patent: Aug. 31, 2004

(54) METHOD AND APPARATUS FOR STORING AND RETRIEVING SECURITY ATTRIBUTES

(75) Inventors: David S. Christie, Austin, TX (US); Rodney Schmidt, Dripping Springs, TX (US); Geoffrey S. Strongin, Austin, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 185 days.

(21) Appl. No.: 10/157,503

(22) Filed: May 29, 2002

(51) Int. Cl.[7] .............................................. G06F 12/14
(52) U.S. Cl. ...................................................... 711/163
(58) Field of Search ............................ 711/3, 128, 136, 711/134, 163, 206

(56) References Cited

U.S. PATENT DOCUMENTS

| | | | | |
|---|---|---|---|---|
| 4,890,223 A | * | 12/1989 | Cruess et al. | ............... 711/207 |
| 5,454,091 A | * | 9/1995 | Sites et al. | ................... 711/203 |
| 2002/0147916 A1 | * | 10/2002 | Strongin et al. | ............ 713/193 |
| 2003/0061495 A1 | * | 3/2003 | Minnick | ...................... 713/189 |
| 2003/0093686 A1 | * | 5/2003 | Barnes et al. | ............... 713/200 |
| 2004/0054895 A1 | * | 3/2004 | Barnes et al. | ............... 713/167 |
| 2004/0064723 A1 | * | 4/2004 | Barnes et al. | ............... 713/201 |

* cited by examiner

Primary Examiner—Hiep T. Nguyen
(74) Attorney, Agent, or Firm—Williams, Morgan & Amerson

(57) ABSTRACT

An apparatus is provided for providing security in a computer system. The apparatus comprises an address generator, a multi-level lookup table, and a cache. The address generator is adapted for producing an address associated with a memory location in the computer system. The multi-level lookup table is adapted for receiving at least a portion of said address and delivering security attributes stored therein associated with said address, wherein the security attributes are associated with each page of memory in the computer system. The cache is a high-speed memory that contains a subset of the information contained in the multi-level lookup table, and may be used to speed the overall retrieval of the requested security attributes when the requested information is present in the cache.

28 Claims, 5 Drawing Sheets

METHOD AND APPARATUS FOR STORING AND RETRIEVING SECURITY ATTRIBUTES

BACKGROUND OF THE INVENTION

1. Field of the Invention

This invention relates generally to a data processor, and, more particularly, to a method and apparatus for ensuring secure operation of the data processor.

2. Description of the Related Art

General purpose computing systems, such as personal computers have evolved from singletask devices to multitask devices. Systems that multitask require security and protection services to protect their operating system from user processes, and to protect the processes from each other. Without protections, a rogue program, for example, could unintentionally destroy the program code or data in the memory space belonging to the operating system or to another process.

Generally, in x86 microprocessor environments, security features have been implemented to provide varying privilege levels. Different types of software run at these varying privilege levels, and thus, have varying access to the resources of the computing system. For example, the operating system runs at the highest privilege level (Ring 0), which means that the operating system generally has free reign to access virtually any of the system resources.

The most recent version of Microsoft's Windows® operating system, Windows 2000®, now has over one million lines of code contained in its kernel and associated kernel-mode drivers. Thus, more than one million lines of code have generally free access to the system resources. There is a significant likelihood that some security defects or other bugs exist within this massive program.

The present invention is directed to overcoming, or at least reducing the effects of, one or more of the problems set forth above.

SUMMARY OF THE INVENTION

In one aspect of the present invention, a method is provided for storing security attributes. The method comprises assigning security attributes to each of a plurality of portions of memory of a computer system; storing the security attributes in a multi-level lookup table; and storing at least a subset of the security attributes in a cache.

In another aspect of the present invention, a method is provided for providing security in a computer system. The method comprises storing security attributes to a plurality of portions of memory of a computer system in a multi-level lookup table, and storing at least a subset of the security attributes in a cache. Thereafter a request to access a portion of memory is received, and a determination is made as to whether the security attributes associated with the requested portion of memory are stored in the cache. The stored security attributes are retrieved from the cache in response to detecting that the security attributes are stored therein. The stored security attributes are retrieved from the multi-level lookup table in response to detecting the absence of the stored security attributes in the cache. Thereafter, access to the requested portion of memory is permitted in response to the retrieved security attributes.

In still another aspect of the present invention, an apparatus is provided for providing security in a computer system. The apparatus comprises an address generator, a cache, and a multi-level lookup table. The address generator is adapted for producing an address associated with a memory location in the computer system. A cache is adapted for receiving at least a portion of the address and delivering security attributes stored therein associated with the address. A multi-level lookup table is adapted for receiving at least a portion of the address and delivering security attributes stored therein associated with the address in response to the absence of the security attributes being located in the cache.

BRIEF DESCRIPTION OF THE DRAWINGS

The invention may be understood by reference to the following description taken in conjunction with the accompanying drawings, in which the leftmost significant digit(s) in the reference numerals denote(s) the first figure in which the respective reference numerals appear, and in which.

Figure 1:
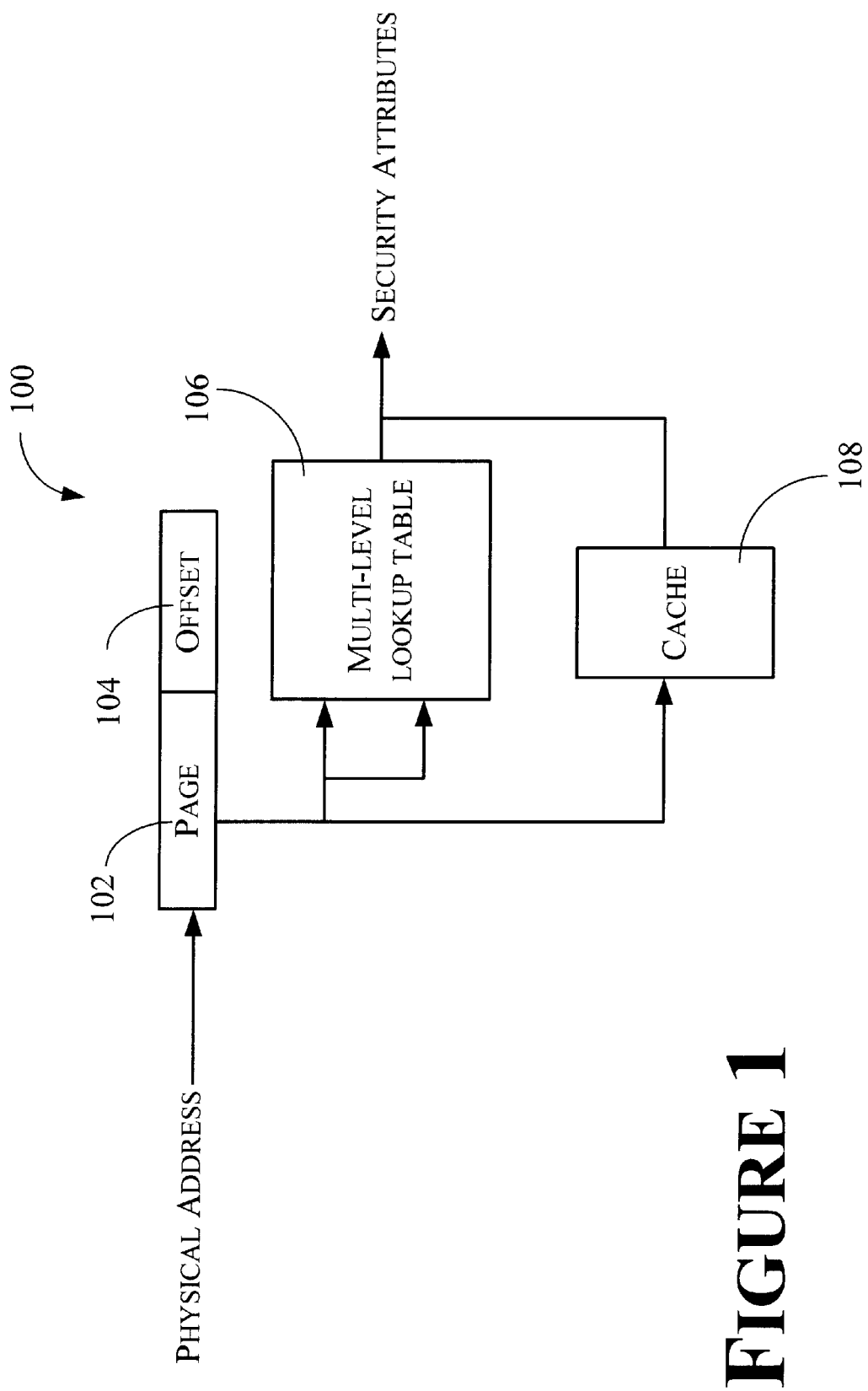
FIG. 1 schematically illustrates one embodiment of a system for storing and retrieving security attributes in a data processor.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but, on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

As shown in FIG. 1, one illustrative embodiment of a system 100 for storing and retrieving security attributes in a data processor or computer system is shown. The system 100 is useful in a data processor (not shown) that uses a virtual addressing scheme for accessing memory. For example, the system 100 is useful in a data processor that addresses memory using a paging scheme, such as may be found in x86 type microprocessors. Moreover, the system 100 finds particular application in a data processor that assigns security attributes at the page level, such as is set forth in an application filed on Dec. 5, 2001 and entitled MEMORY MANAGEMENT SYSTEM AND METHOD PROVIDING INCREASED MEMORY ACCESS SECURITY, which is assigned to the assignee of the instant application and is hereby incorporated by reference in its entirety.

The system 100 receives an address from an address generator, such as may be found in X86 type microprocessors. In the illustrated embodiment, the address generator produces a physical address; however, the instant invention is not so limited, but rather, may have application to other types of addresses, such as a virtual, linear, or intermediate address. In the illustrated embodiment, the address is a physical address that is composed of a page portion 102 and an offset portion 104, as opposed to a virtual, linear, or intermediate address that would be received by a paging unit in an x86 type microprocessor. Rather, the system 100 receives the physical address, such as would be produced by the paging unit in an x86 type microprocessor.

A multi-level lookup table 106, which is generally referred to as the extended security attributes table (ESAT), receives the page portion 102 of the physical address. The multi-level lookup table 106 stores security attributes associated with each page of memory. That is, each page, which may be for example 4k bytes in size, has certain security attributes associated with it and stored in the multi-level lookup table 106. For example, the security attributes associated with each page may include look down, security context ID, lightweight call gate, read enable, write enable, execute, external master write enable, external master read enable, encrypt memory, security instructions enabled, etc. These attributes are explained in greater detail herein in conjunction with FIGS. 3A and 3B below.

Generally, the multi-level lookup table 106 is located in system memory (not shown) of a computer system or data processor that includes a microprocessor that employs the system 100. Accordingly, the speed at which the multi-level lookup table 106 is capable of operating is, at least in part, dependent upon the speed of the system memory. The speed of the system memory, as compared to the speed of the microprocessor, is relatively slow. Thus, the process of retrieving the security attributes using the multi-level lookup table 106 may slow the overall operation of the computer system. To help reduce the time necessary to locate and retrieve the security attributes, a cache 108 is implemented in parallel with the multi-level lookup table 106. The cache 108 may be located on the same semiconductor die as the microprocessor or external to the microprocessor die, but in either event, the speed of the cache 108 may be substantially faster than the speed of the multi-level lookup table 106. The cache 108 contains a smaller subset of the pages and their security attributes contained within the multi-level lookup table 106. Thus, for the pages stored in the cache 108, the operation of retrieving the security attributes may be substantially enhanced.

Figure 2:
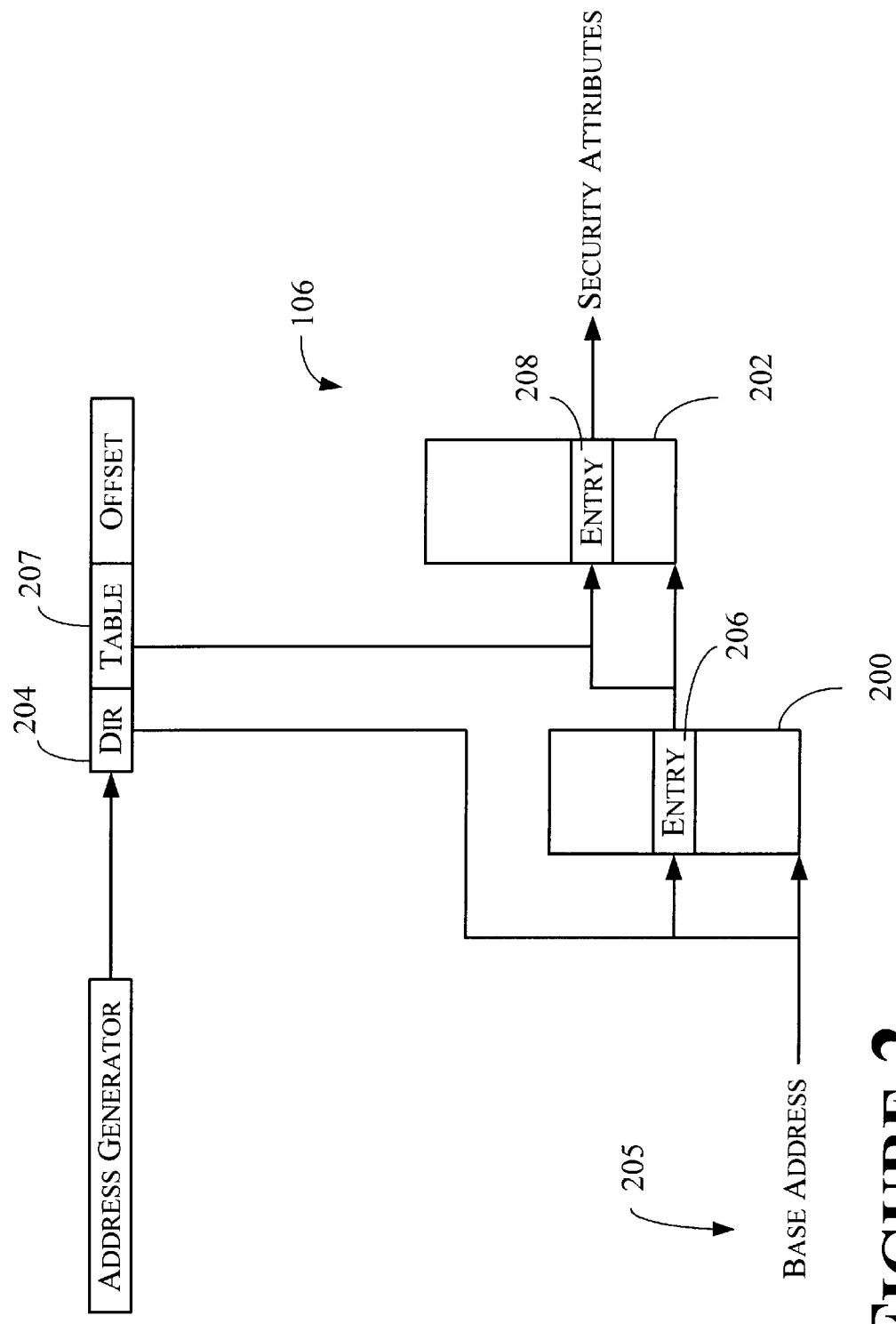
FIG. 2 schematically illustrates one embodiment of a multi-level lookup table for storing and retrieving security attributes in a data processor.

Turning now to FIG. 2, one embodiment of the multi-level lookup table 106 used for storing and retrieving the security attributes associated with a page in memory is shown. The multi-level lookup table 106 is comprised of a first table 200, which is generally referred to as an ESAT directory, and a second table 202, which is generally referred to as the ESAT. Generally, the first table 200 contains a directory of starting addresses for a plurality of ESATs 202 in which the security attributes for each of the pages is stored. In the embodiment illustrated herein, a single ESAT directory 200 may be used to map the entire memory.

Figure 3A:
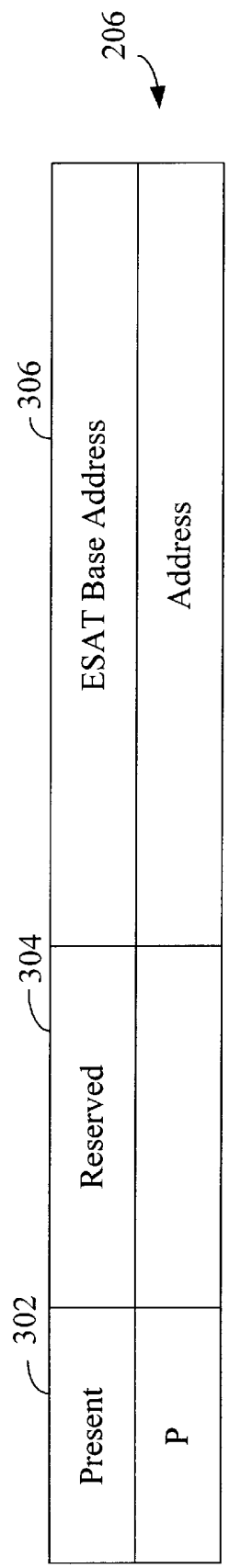
FIGS. 3A and 3B illustrate one embodiment of a format for entries in the multi-level lookup table of FIGS. 1 and 2.

A first portion of the physical address 204, which includes the highest order bits and is generally referred to as the directory (DIR), is used as a pointer into the first table 200. The first table 200 is located in the system memory at a base address 205. The DIR portion 204 of the physical address is added to the base address 205 to identify an entry 206, which points to a base address of an appropriate one of the second tables 202. One exemplary embodiment of the entry 206 is shown in FIG. 3A. The entry 206 is generally comprised of three fields, a present field 302, a reserved field 304, and an ESAT base address field 306. The ESAT base address field 306 contains the base address of the appropriate ESAT 202. The present field is discussed in greater detail in conjunction with FIG. 4. The reserved field 304 is not currently used, but is reserved for future functionality.

Returning to FIG. 2, it should be appreciated that a plurality of the second tables 202 may be present. Generally, each one of the entries 206 in the first table 200 points to a starting address of one of the second tables 202. That is, each entry 206 may point to its own separate ESAT 202.

In one embodiment, the first table 200 and each of the second tables 202 occupy one a page in physical memory. Thus, a conventional memory management unit in an x86 type microprocessor with paging enabled is capable of swapping the tables 200, 202 in and out of the system memory, as needed . That is, because of the two-level arrangement of the tables 200, 202, not all of the tables 202 need to be simultaneously present in the physical memory for the system 100 to operate properly. If one of the tables 202 that is not currently located in physical memory is requested by an entry 206 in the first table 200, the conventional memory management unit of the x86 microprocessor may read the page from main memory, such as a hard disk drive, and store the requested page 202 in the system memory where it may be accessed. This one page sizing of the tables 200, 202 reduces the amount of system memory needed to contain the multi-level lookup table 106, and reduces the amount of memory swapping needed to walk the tables 200, 202. Another advantage of the page-size granularity of the hierarchical tables over a monolithic table is that portions of the table can be placed in any available pages, however scattered they might be in physical memory. Also, table space does not need to be allocated for large parts of the address space that are unused (i.e. where there are no peripheral device access ports or DRAM mapped), requiring significantly less DRAM for security attribute storage. Thus, security attribute storage is substantially proportional to the amount of installed DRAM. in one exemplary embodiment, each page is 4 Kbytes in size, and the system memory totals 16 Mbytes. Thus, 4096 ESAT tables 202 each contain 4096 sets of security attributes, and the ESAT directory 200 contains the starting address for each of the 4096 ESAT tables 202.

The entry 206 of the first table 200 points to the base address of the appropriate second table 202. A desired entry 208 in the appropriate second table 202 is identified by adding a second portion 202 (the table portion) of the physical address to the base address contained in the entry 206. The entry 208 contains, inter alia, the security attributes associated with the identified page in physical memory.

Figure 3B:
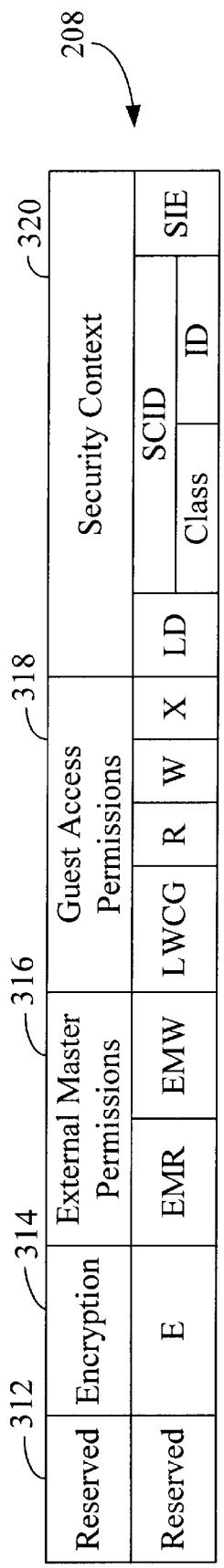

One exemplary embodiment of the entry 208 is shown in FIG. 3B. One embodiment of the entry 208 is schematically illustrated in FIG. 3B. The entry 208 in the illustrated embodiment is comprised of five main fields, with subfields under at least some of these. The five main fields include a reserved field 312, an encryption field 314, an external master permissions field 316, a guest access permission field 318, and a security context field 320.

The encryption field 314 is generally used to specify that the contents of the associated page are encrypted in system memory, and must be decrypted when brought into the processors cache, and if modified in the processor's cache, re-encrypted before being written back to system memory.

The external master permission field 316 is generally used to indicate how peripheral devices may access the associated page. For example, access may be restricted to only reads, only writes, or no access at all, depending on the contents of this field.

The guest access permission field 318 is generally used to control CPU accesses to the associated page made by certain application programs. For example, access may be restricted to only reads, only writes, or only code fetches (execute-only), depending on the contents of this field. A page may also be designated as a control transfer gate, restricting the entry points at which guest software may transfer control to secure software.

The security context field 320 is generally used to indicate what program owns the page, whether the page is considered secure, and to further restrict access (beyond the restrictions specified by the guest access permissions field 318) to specific programs or classes of programs.

Figure 4:
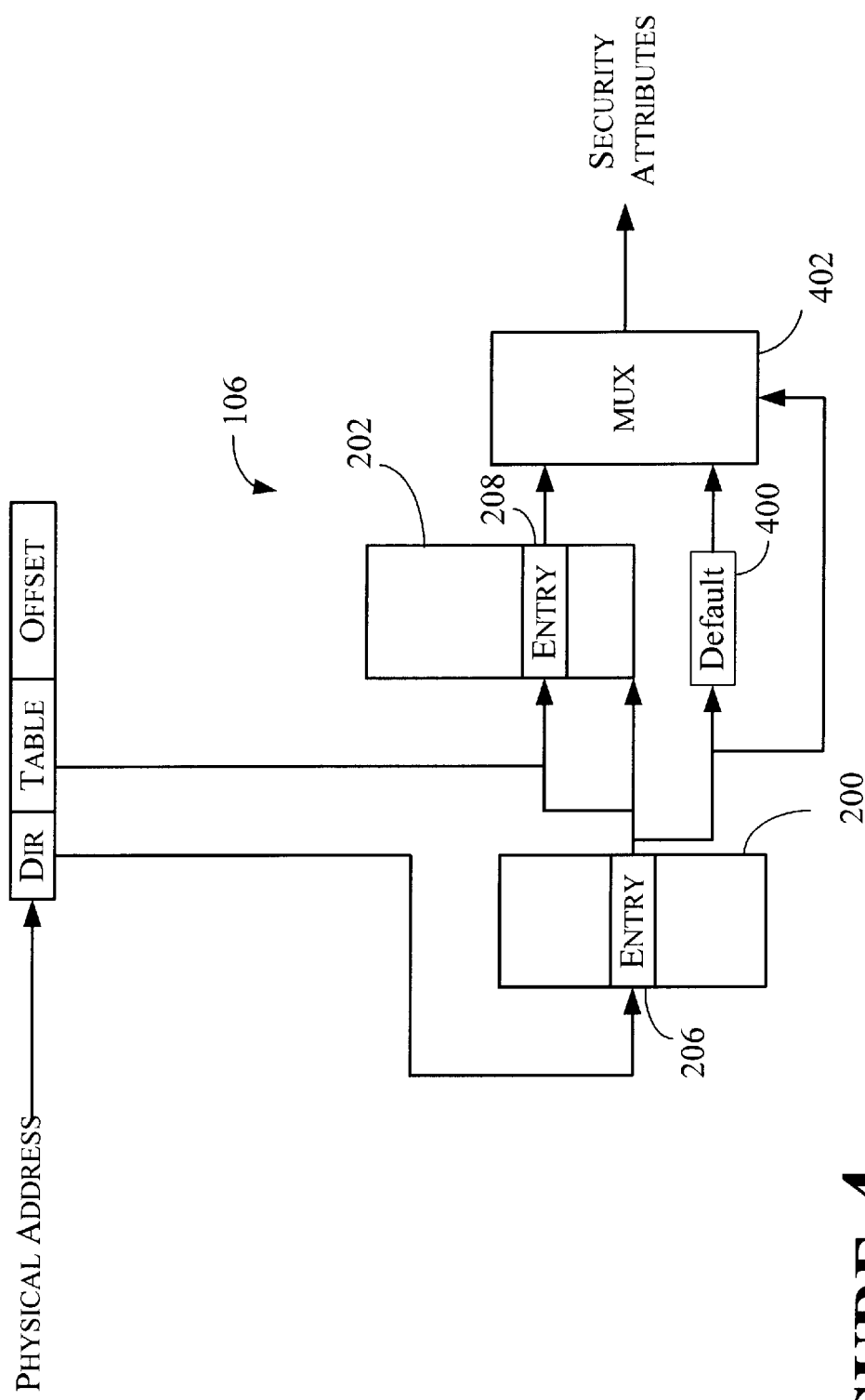
FIG. 4 schematically illustrates an alternative embodiment of the multi-level lookup table for storing and retrieving security attributes in a data processor.

Turning now to FIG. 4, an alternative embodiment of the multi-level table lookup 106 of FIG. 1 is shown. In this embodiment, the present field 302 is used to identify a group of pages that have a common set of security attributes. In a data processor or computer system, many of the pages will require the same type of security attributes. In fact, many of the pages will have precisely the same security attributes assigned to them. Thus, generating ESATs 202 with identical entries 208 may not efficiently utilize the resources of the computer system.

Accordingly, a default register 400 is provided. The default register 400 may be configured substantially similar to the entries 208 in the ESATs 202 in that it may contain the same fields 312–320 set forth in FIG. 3B. The fields 312–320 of the default register 400 are programmed with values that correspond to a substantial group of the pages in physical memory. A multiplexer 402 is coupled to receive output signals from the ESAT 202 and the default register 400. The multiplexer 402 has its select bit coupled to receive the present field 302 to determine if a set of security attributes are stored in the corresponding ESAT 202, or whether the default values stored in the register 400 should be used. If the present field 302 is set, then the security attributes are retrieved from the appropriate entry 208 in the appropriate ESAT 202, as described above in conjunction with FIG. 2. On the other hand, if the present field 302 is not set, then the multiplexer 402 is enabled to deliver the security attributes stored in the default register 400. At the same time, the ESAT 202 is blocked from providing its identified entry 208.

One exemplary set of default security attributes that may be stored in the default register 400 is as follows:
LD: not set;
SCID: class: 0, ID:0;
LWCG: disabled;
Guest access permissions: R, W, X set to enabled;
External master permissions: R, W set to disabled; and
Encryption: disabled.

Figure 5:
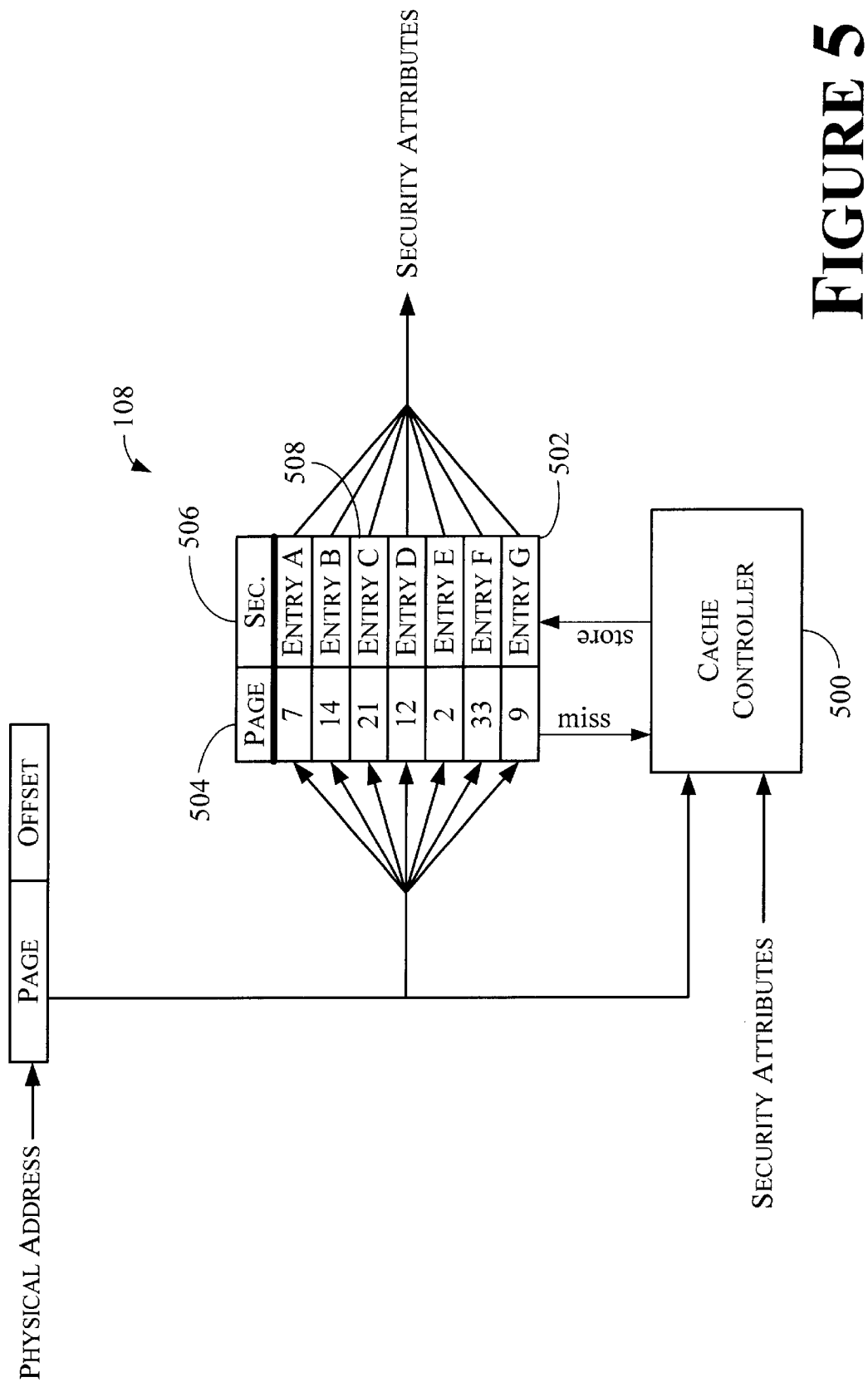
FIG. 5 schematically illustrates one embodiment of a cache for storing and retrieving security attributes in a data processor.

Turning now to FIG. 5, one embodiment of the cache 108 for storing and retrieving security attributes in the data processor is illustrated. The cache 108 is made up of a cache controller 500 and a block of high-speed, associative memory 502, such as static random access memory (SRAM).

The high-speed, associative memory 502 is arranged in two columns, an address or page number 504 and corresponding security attributes 506, and both may be altered by the cache controller 500. The associative memory 502 has addresses that need not be consecutive. Rather, the addresses are assigned to each location as labels. When the associative memory 502 is accessed, every address 504 is checked at the same time, but only the location whose address label matches the address to be accessed is activated. For example, assume that the associative memory 502 receives the page portion of the physical address, and the physical address to be accessed is located in page 21. The associative memory 502 compares all of its addresses/pages 504 to the requested page (21). In the illustrated embodiment, page 21 is present in the associative memory 502 at location 508, and its security attributes 506, which are identified as Entry C, are delivered in lieu of the security attributes stored in the ESAT 202. Owing to the high-speed operation of the associative memory 502, the security attributes are supplied substantially faster than if they had been supplied by the multi-level table lookup 106.

Because the associative memory 502 is substantially smaller than the multi-level lookup table 106, not all of the pages and their corresponding security attributes may be stored therein. Thus, at least occasionally, the associative memory 502 will not contain the requested page, and will produce a "miss" signal to indicate the absence of the requested page. This miss signal is delivered to the cache controller 500, which may take two actions. First, the cache controller 500 notifies the multi-level lookup table 106 that the page has missed in the cache 108. The miss signal causes the multi-level lookup table 106 to complete the process of locating the security attributes in the ESAT 202 (also know as walking the table). Thus, when the high-speed cache 108 misses, the slower multi-level lookup table 10 provides the security attributes.

The more often that the cache 108 "hits," the faster the overall operation of the system 100 and the data processor will be. Accordingly, one of the functions of the cache controller 500 is to maintain the associative memory 502 supplied with those pages that are going to be requested. There are a number of algorithms that may be employed to provide a high hit ratio in the cache 108. For example, the cache controller 500 may use replacement algorithms such as first-in, first-out replacement. That is, the oldest page in the cache 108 is identified for replacement. Alternatively, a least recently used (LRU) page replacement algorithm may be employed by the cache controller 500. The LRU algorithm replaces the page that has not been used for the longest time. The cache controller 500 may also use a least frequently used (LFU) page replacement algorithm. The LFU algorithm replaces the page that has been used the least. A not used recently algorithm may also be employed. These and a variety of other replacement algorithms may be employed without departing from the spirit and scope of the instant invention.

Generally, the cache controller 500 responds to the miss signal by monitoring the security attributes delivered by the multi-level lookup table 106. These security attributes along with the page number may then be stored in the associative memory 502 using one or more of the replacement algorithms identified above.

The particular embodiments disclosed above are illustrative only, as the invention may be modified and practiced in different but equivalent manners apparent to those skilled in the art having the benefit of the teachings herein.

Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method for storing security attributes in a computer system, comprising:
assigning security attributes to each of a plurality of portions of memory of a computer system;
storing said security attributes in a multi-level lookup table having at least one first table and at least one second table, each of the first and second tables occupying one page; and
storing at least a subset of said security attributes in a cache.

2. A method, as set forth in claim 1, wherein assigning security attributes to each of the plurality of portions of memory further comprises assigning security attributes to each page of memory of a computer system.

3. A method, as set forth in claim 1, wherein storing said security attributes in the multi-level lookup table further comprises storing in the first table information regarding a plurality of second tables having said security attributes stored therein.

4. A method, as set forth in claim 3, further comprising locating the first table in memory at an address defined by a preselected base address.

5. A method, as set forth in claim 3, wherein storing in the first table information regarding locations of a plurality of second tables having said security attributes stored therein further comprises combining the information stored in the first table with at least a portion of a requesting address to identify an address within a selected one of the plurality of second tables.

6. A method, as set forth in claim 3, wherein each of the plurality of portions of memory is identified by an address range and storing said security attributes in a multi-level lookup table fix comprises storing security attributes associated with each portion of memory in a select one of the second tables based upon at least a portion of the identifying address range.

7. A method, as set forth in claim 1, wherein storing at least a subset of said security attributes in a cache further comprises storing the security attributes associated within select ones of the plurality of portions of memory of the computer system.

8. A method for providing security in a computer system, comprising:
storing security attributes to a plurality of portions of memory of a computer system in a multi-level lookup table having at least one first table and at least one second table, each of the first and second tables occupying one page;
storing at least a subset of said security attributes in a cache;
receiving a request to access a portion of memory;
determining if the security attributes associated with said requested portion of memory are stored in said cache, and retrieving the stored security attributes from said cache in response to detecting that the security attributes are stored therein;
retrieving the stored security attributes from the multi-level lookup table in response to detecting the absence of said stored security attributes in said cache; and
permitting access to the requested portion of memory in response to the retrieved security attributes.

9. A method, as set forth in claim 8, wherein storing security attributes to the plurality of portions of memory of the computer system further comprises storing security attributes to a plurality of pages of memory of the computer system.

10. A method, as set forth in claim 8, wherein storing said security attributes in the multi-level lookup table further comprises storing in the first table information regarding locations of a plurality of second tables having said security attributes stored therein.

11. A method, as set forth in claim 10, further comprising locating the first table in memory at an address defined by a preselected base address.

12. A method, as set forth in claim 10, wherein storing in the first table information regarding locations of the plurality of second tables having said security attributes stored therein fisher comprises combining the information stored in the first table with at least a portion of a requesting address to identify an address within a selected one of the plurality of second tables.

13. A method, as set forth in claim 10, wherein each of the plurality of portions of memory is identified by an address range and storing said security attributes in the multi-level lookup table further comprises storing security attributes associated with each portion of memory in a select one of the second tables based upon at least a portion of the identifying address range.

14. A method, as set forth in claim 8, wherein storing at least a subset of said security attributes in a cache further comprises storing the security attributes associated within select ones of the plurality of portions of memory of the computer system.

15. An apparatus for providing security in a computer system comprising:
an address generator adapted for producing an address associated with a memory location in the computer system;
a cache adapted for receiving at least a portion of said address and delivering security attributes stored therein associated with said address; and
a multi-level lookup table having at least one first table and at least one second table, each of the first and second tables occupying one page, the multi-level lookup table being adapted for receiving at least a portion of said address and delivering security attributes stored therein associated with said address in response to the absence of said security attributes being located in said cache.

16. An apparatus, as set forth in claim 15, wherein the multi-level lookup table is adapted to store security attributes to a plurality of pages of memory of the computer system.

17. An apparatus, as set forth in claim 15, wherein the first table has information stored therein regarding locations of a plurality of second tables having said security attributes stored herein.

18. An apparatus, as set forth in claim 17, wherein said first table is located in memory at an address defined by a preselected base address.

19. An apparatus, as set forth in claim 17, wherein the multi-level lookup table is adapted to combine the information stored in the first table with at least a portion of the address to identify an address within a selected one of the plurality of second tables.

20. An apparatus, as set forth in claim 17, wherein the memory is comprised of a plurality of portions identified by an address range and the multi-level lookup table is adapted to store security attributes associated with each portion of memory in a select one of the second tables based upon at least a portion of the identifying address range.

21. An apparatus, as set forth in claim 15, wherein the cache is an associative memory.

22. An apparatus, as set forth in claim 21, wherein the associative memory is a high-speed associative memory.

23. An apparatus, as set forth in claim 15, further comprising a cache controller for selecting the information stored in the cache.

24. An apparatus, as set forth in claim 23, wherein the cache controller selects the information stored in the cache using a least recently used replacement algorithm.

25. An apparatus, as set forth in claim 23, wherein the cache controller selects the information stored in the cache using a least frequently used replacement algorithm.

26. An apparatus, as set forth in claim 23, wherein the cache controller selects the information stored in the cache using a not recently used replacement algorithm.

27. An apparatus for storing security attributes in a computer system, comprising:

means for assigning security attributes to each of a plurality of portions of memory of a computer system;

means for storing said security attributes in a multi-level lookup table having at least one first table and at least one second table, each of the first and second tables occupying one page; and means for storing at least a subset of said security attributes in a cache.

28. An apparatus for providing security in a computer system, comprising:

means for storing security attributes to a plurality of portions of memory of a computer system in a multi-level lookup table having at least one first table and at least one second table, each of the first and second tables occupant one page;

means for storing at least a subset of said security attributes in a cache;

means for receiving a request to access a portion of memory;

means for determining if the security attributes associated with said requested portion of memory are stored in said cache, and retrieving the stored security attributes from sad cache in response to detecting that the security attributes are stored therein;

means for retrieving the stored security attributes from the multi-level lookup table in response to detecting the absence of said stored security attributes in said cache; and means for permitting access to the requested portion of memory in response to the retrieved security attributes.

* * * * *

UNITED STATES PATENT AND TRADEMARK OFFICE
CERTIFICATE OF CORRECTION

PATENT NO.     : 6,785,790 B1
DATED          : August 31, 2004
INVENTOR(S)    : Christie et al.

It is certified that error appears in the above-identified patent and that said Letters Patent is hereby corrected as shown below:

Column 7,
Line 41, delete "fix" and insert -- further --.

Column 8,
Line 18, delete "fisher"and insert -- further --.

Signed and Sealed this

Second Day of November, 2004

JON W. DUDAS
*Director of the United States Patent and Trademark Office*